United States Patent
Ido

(10) Patent No.: US 8,995,024 B2
(45) Date of Patent: Mar. 31, 2015

(54) IMAGE PROCESSING APPARATUS, IMAGE PROCESSING METHOD, AND PROGRAM

(71) Applicant: Canon Kabushiki Kaisha, Tokyo (JP)

(72) Inventor: Yoko Ido, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 13/903,228

(22) Filed: May 28, 2013

(65) Prior Publication Data

US 2013/0321873 A1 Dec. 5, 2013

(30) Foreign Application Priority Data

May 30, 2012 (JP) ................................. 2012-122903

(51) Int. Cl.
*G06K 15/02* (2006.01)
*H04N 1/60* (2006.01)
*G06K 15/00* (2006.01)

(52) U.S. Cl.
CPC .............. *G06K 15/1878* (2013.01); *H04N 1/60* (2013.01); *H04N 1/6027* (2013.01); *H04N 1/6058* (2013.01); *G06K 15/002* (2013.01)
USPC ....................................................... 358/3.27

(58) Field of Classification Search
CPC .......... G06F 2203/014; G06F 2201/81; G06F 3/1259; G06K 15/002; G06K 15/1878; H04N 1/60; H04N 1/6027; H04N 1/6058
USPC .................................. 358/3.27; 399/54, 39, 82
See application file for complete search history.

(56) References Cited

U.S. PATENT DOCUMENTS 8,401,411 B2 * 3/2013 Yamade ......................... 399/54
2006/0001931 A1 1/2006 Danciu

FOREIGN PATENT DOCUMENTS

EP 1294178 A2 3/2003
JP 2009-038498 A 2/2009

* cited by examiner

*Primary Examiner* — Charlotte M Baker
(74) *Attorney, Agent, or Firm* — Canon U.S.A., Inc. IP Division

(57) ABSTRACT

An image processing apparatus includes an input unit configured to input an instruction to perform color conversion, a color conversion unit to perform color conversion based on the instruction by using a first color matching profile, and a display unit configured to display a message which indicates that an effect of color conversion on the vividness of an image is small, in a case where a color difference between the image on which color conversion has been performed by using the first color matching profile and the image on which color conversion has been performed by using a second color matching profile is less than a color matching threshold value.

14 Claims, 19 Drawing Sheets

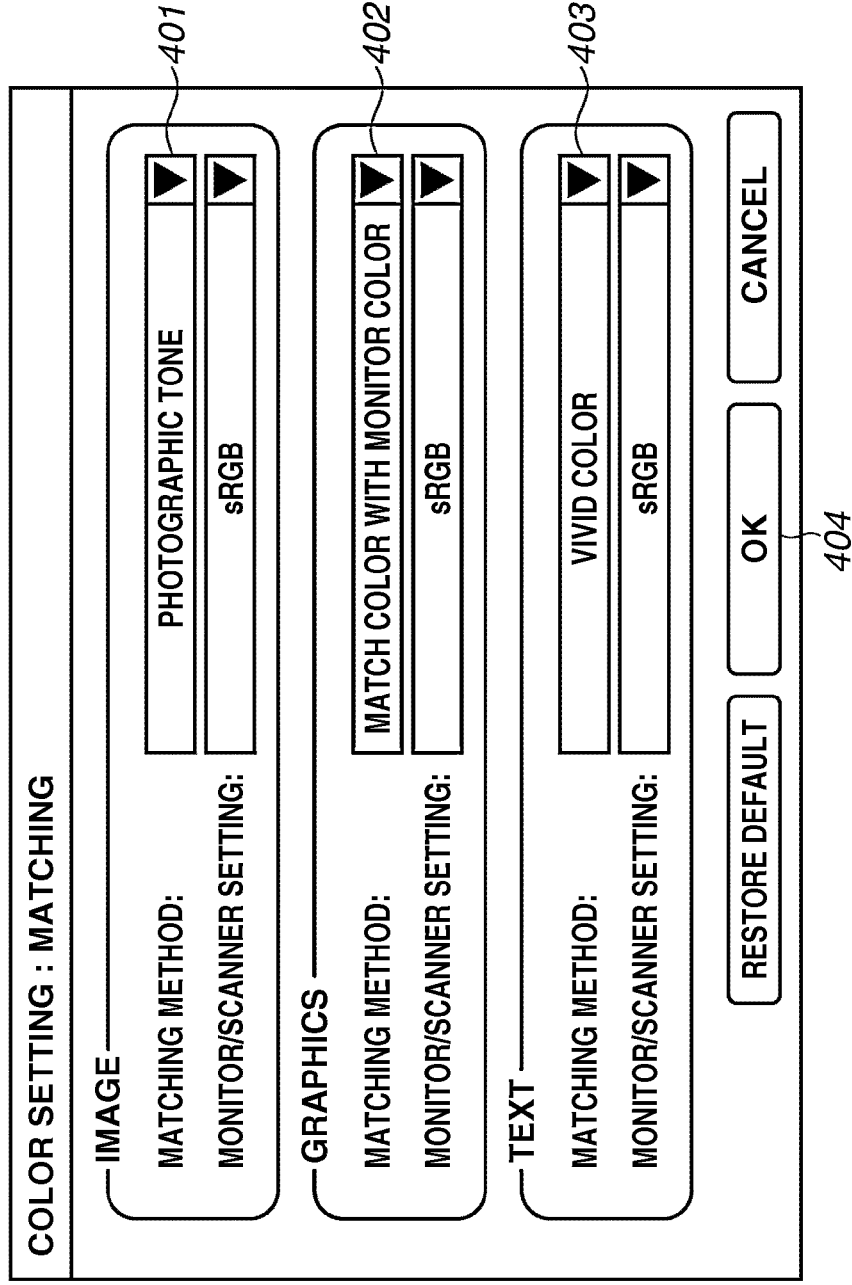

FIG.5

| CHANGE OF MATCHING METHOD |
|---|

CHANGING FROM "PHOTOGRAPHIC TONE" TO "VIVID PHOTO" HAS SMALL EFFECT ON VIVIDNESS OF CORRESPONDING PART OF IMAGE. WOULD YOU LIKE TO CHANGE?

501 — ◉ YES. PLEASE CHANGE TO "VIVID PHOTO".
   ✱THIS IS RECOMMENDED IF YOU WOULD LIKE
   TO MAKE OTHER PART OF IMAGE VIVID.

502 — ○ NO. PLEASE DO NOT CHANGE TO "VIVID PHOTO".
   (PLEASE DO NOT CHANGE ANYTHING.)

503 — ○ NO. PLEASE DO NOT CHANGE TO "VIVID PHOTO"
   BUT PERFORM OTHER COLOR ADJUSTMENT.

[ OK ]   [ CANCEL ]
  504       505

```
┌─────────────────────────────────────────────────────────┐
│ CHANGE OF MATCHING METHOD                               │
├─────────────────────────────────────────────────────────┤
│                                                         │
│   THIS IS NOT RECOMMENDED BECAUSE CHANGING FROM         │
│   "PHOTOGRAPHIC TONE" TO "VIVID PHOTO" HAS SMALL        │
│   EFFECT ON VIVIDNESS.                                  │
│                                                         │
│  1601 —— ⦿  NO. PLEASE DO NOT CHANGE TO "VIVID PHOTO".  │
│             (PLEASE DO NOT CHANGE ANYTHING.)            │
│                                                         │
│  1602 —— ◯  PLEASE PERFORM OTHER COLOR ADJUSTMENT.      │
│                                                         │
│                                                         │
│                              [   OK   ]  [  CANCEL  ]   │
└─────────────────────────────────────────────────────────┘
```

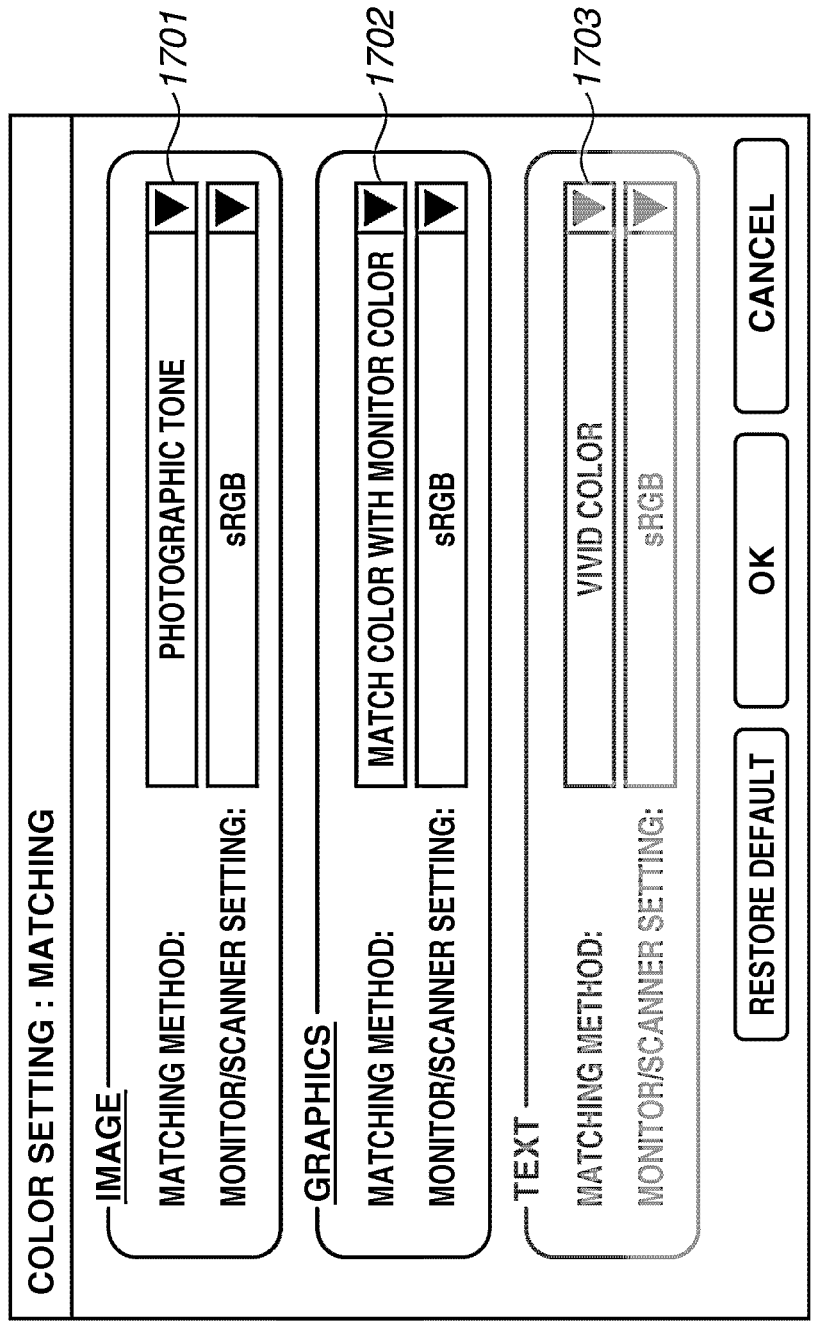

IMAGE PROCESSING APPARATUS, IMAGE PROCESSING METHOD, AND PROGRAM

BACKGROUND OF THE INVENTION

1. Field of the Invention

The present invention relates to an image processing apparatus for performing color conversion, an image processing method, and a program.

2. Description of the Related Art

There is provided an electrophotographic printer including a function for changing color matching methods with respect to images. "Perceptual (photographic)", "Colorimetric (minimum color-difference)", "Saturation (vivid color)", and "Match Color with Monitor Color" are examples of the color matching methods. The Perceptual (photographic) is a color matching method for making an image vivid, whereas the Saturation (vivid color) is a color matching method for making graphics and texts vivid. These matching methods can be applied to the entire image, or can be changed at each object included in the image. By providing the various color matching methods, a user can select and use desired color matching methods in a suitable manner, so that an image with colors that satisfy needs of the user can be printed.

In a case of making an image vivid, "Vivid Photo" is known as a color matching method capable of making colors deeper and more vivid than in the Perceptual (photographic). For example, by changing the color matching method applied to the image from "Perceptual (photographic)" to "Vivid Photo", the image can be generated with more vivid colors. Japanese Patent Application Laid-Open No. 2009-038498 discusses a method for making an image vivid by specifying the Vivid Photo.

However, even if the color matching method for making the image vivid (such as the Vivid Photo) is set thereto, there may be a case where a vivid image cannot be acquired depending on an input image. For example, as for the color that is mapped in a vicinity of a boundary of a printer color reproduction range when color matching is performed by specifying the photographic, vividness thereof cannot be improved even if the color matching method is changed to the Vivid Photo.

SUMMARY OF THE INVENTION

An aspect of the present invention is directed to displaying an effect of a color matching method on vividness of an image in a case where color matching is performed on the image using a specified color matching method.

According to an aspect of the present invention, an image processing apparatus includes an input unit configured to input an instruction to perform color conversion, a color conversion unit to perform color conversion based on the instruction by using a first color matching profile, and a display unit configured to display a message which indicates that an effect of color conversion on the vividness of an image is small, in a case where a color difference between the image on which color conversion has been performed by using the first color matching profile and the image on which color conversion has been performed by using a second color matching profile is less than a color matching threshold value.

According to the present invention, in a case where color matching is performed on an image using a profile, an effect on vividness of the image can be displayed.

Further features of the present invention will become apparent from the following description of exemplary embodiments with reference to the attached drawings.

BRIEF DESCRIPTION OF THE DRAWINGS

FIG. 4 illustrates an example of a user interface (UI) for changing a color matching method.

FIG. 5 illustrates an example of a warning message UI described in a first exemplary embodiment of the present invention.

FIG. 10 illustrates an example of a UI for adjusting toner density.

FIG. 16 illustrates an example of a warning message UI displayed when an effect of changing a color matching method cannot be seen in general.

FIG. 17 illustrates an example of a UI for changing a matching method described in the fourth exemplary embodiment.

DESCRIPTION OF THE EMBODIMENTS

Various exemplary embodiments, features, and aspects of the invention will be described in detail below with reference to the drawings.

Figure 1:
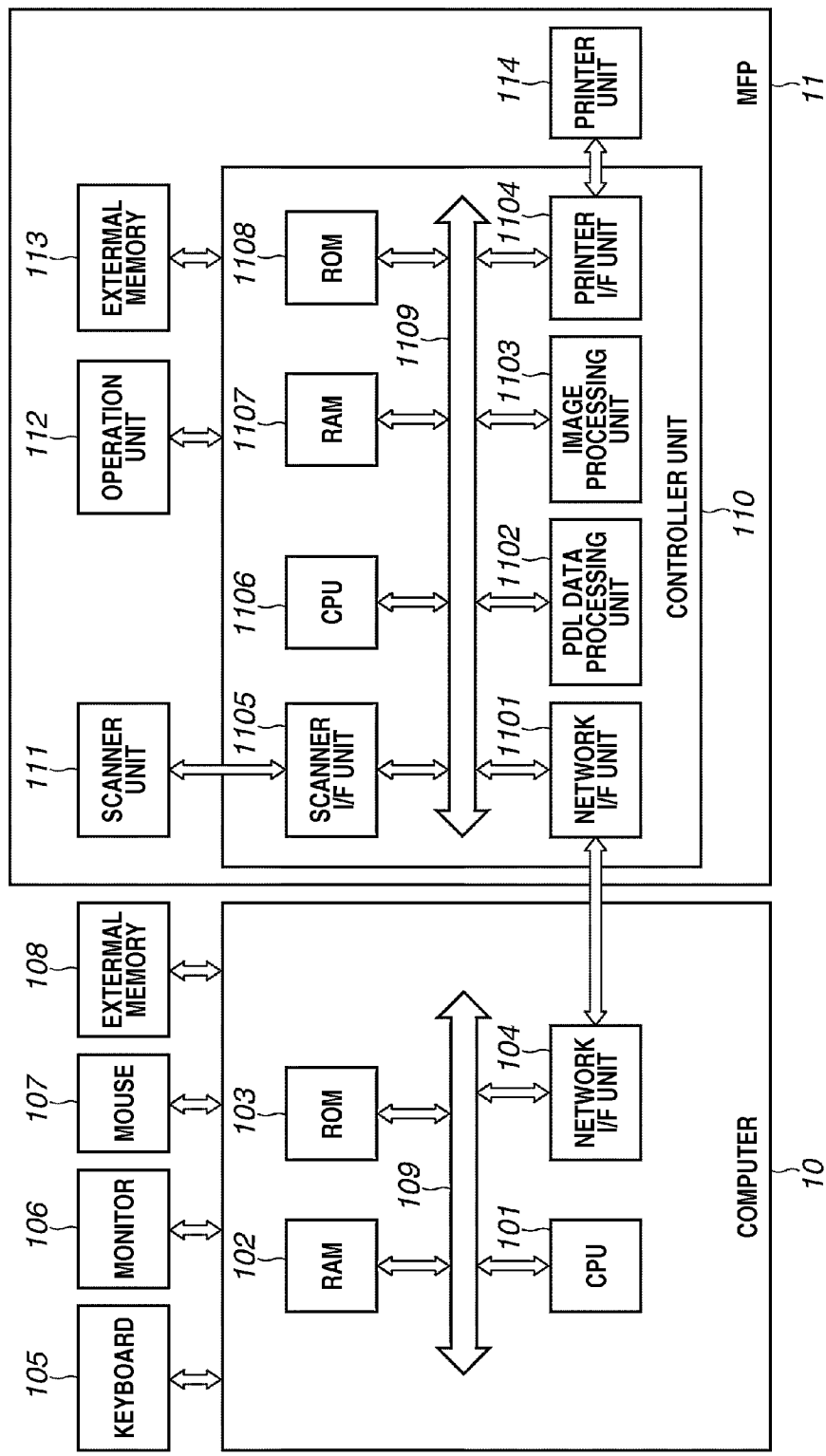
FIG. 1 is a system configuration diagram including a computer and a multifunction peripheral (MFP) according to an exemplary embodiment of the present invention.

FIG. 1 is a block diagram illustrating a configuration of a printer control system including a computer according to a first exemplary embodiment. Unless otherwise specified, it is obvious that the present invention can be applied to both a single device and a system including a plurality of devices as long as the functions according to the present invention can be executed. Further, unless otherwise specified, it is obvious that the present invention can be applied to a system in which processing is performed by connecting to a network such as a local area network (LAN) or a wide area network (WAN) as long as the functions according to the present invention can be executed.

<System Configuration Diagram of Present Invention>

In FIG. 1, a host computer 10 includes a central processing unit (CPU) 101 for executing processing based on an application program stored in a read only memory (ROM) 103 or an external memory 108. The CPU 101 comprehensively controls each device connected to a system bus 109.

An operating system program (hereinbelow, referred to as "OS") serving as a control program of the CPU 101 is stored in the ROM 103 or the external memory 108. A random access memory (RAM) 102 functions as a main memory or a work area of the CPU 101. In FIG. 1, a network interface (I/F) unit 104 is connected to a network I/F unit 1101 of a multi-function printer (hereinbelow, referred to as "MFP") 11, and executes communication control processing with the MFP 11.

In addition, a keyboard 105 and a mouse 107 as input devices and a monitor 106 as an output device are connected to the computer 10. Based on a command instructed by a mouse cursor (not illustrated) on the monitor 106, the CPU 101 opens various windows registered therein, and executes various types of data processing. When a user executes printing, the user can open a window relating to a print setting and set a printing processing method including the printer setting and a print mode option with respect to a printer driver.

The MFP 11 includes a controller unit 110, a scanner unit 111, an operation unit 112, an external memory 113, and a printer unit 114. In the controller unit 110, a CPU 1106 outputs an image signal based on a control program to the printer unit 114 via a printer I/F unit 1104 connected to a system bus 1109. The control program is stored in a ROM 1108 or the external memory 113. The control program of the CPU 1106 is stored in the ROM 1108. The CPU 1106 can perform communication processing with the computer 10 via a network I/F unit 1101, and is configured to be capable of notifying the computer 10 of information within the printer. A RAM 1107 functions as a main memory or a work area of the CPU 1106.

In the printing processing from the computer 10, a page description language (PDL) that is input via the keyboard 105 or the mouse 107 is transmitted to the controller unit 110 via the network I/F units 104 and 1101. Then, a PDL data processing unit 1102 interprets the PDL and performs rendering, an image processing unit 1103 performs printer output image processing, and the printer unit 114 prints the processed image data.

In copy processing, the scanner unit 111 reads a document, the image processing unit 1103 performs printer output image processing via the scanner I/F unit 1105 and the system bus 1109, and the printer unit 114 prints the processed image data.

<Image Processing Unit>

Figure 2:
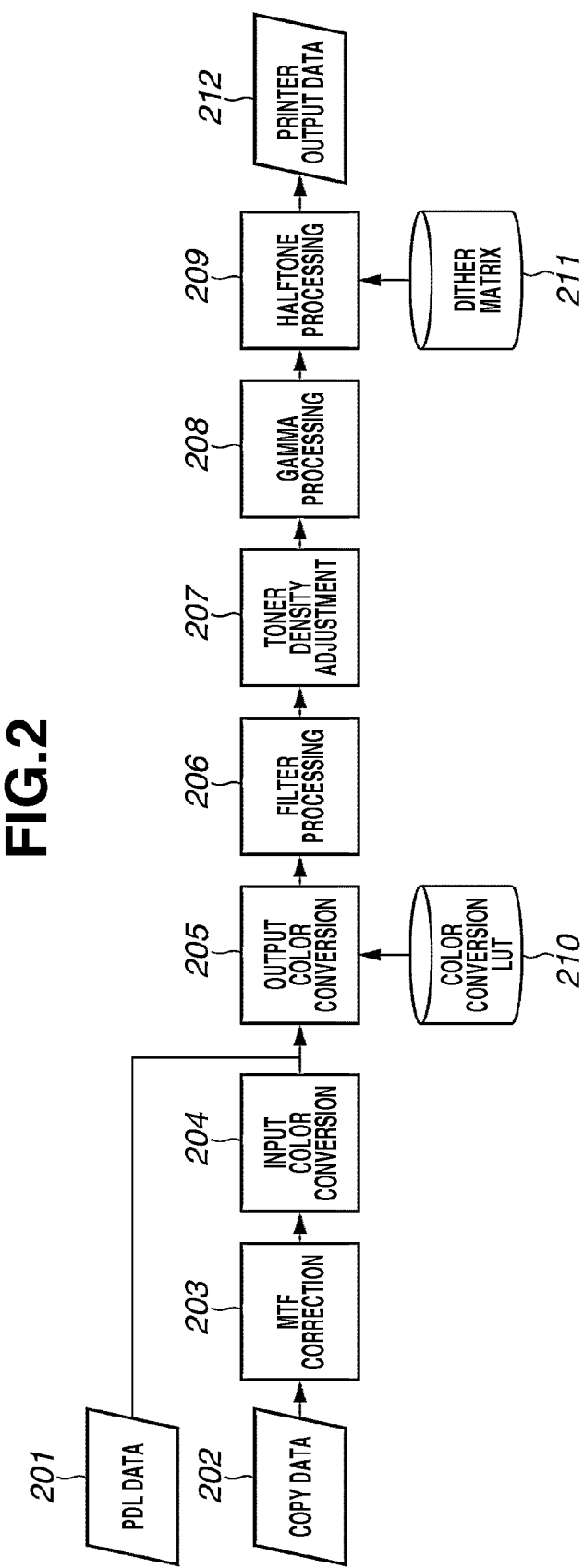
FIG. 2 is a block diagram illustrating print processing according to an exemplary embodiment of the present invention.

FIG. 2 illustrates a process flow in which the image processing unit 1103 performs image data processing for copying and printing. The image processing unit 1103 includes a block that is unique to a copy function operation period and processing common to the operation periods of both the copy function and a PDL print function, so that the image processing unit 1103 performs processing on image data transmitted from the CPU 1106 via the system bus 1109, and returns a processing result to the CPU 1106 via the system bus 1109.

When a copy operation is executed, in modulation transfer function (MTF) correction 203, read frequency characteristics of multi-valued image data (it is assumed 8 bits) read by the scanner unit 111 is corrected. In input color conversion 204, with respect to the corrected image data, a color space unique to the scanner unit 111 is converted into a common red-green-blue (RGB) color space. According to the present exemplary embodiment, the color space conversion in input color conversion 204 is to convert the color space from the color space of the scanner unit 111 to a colorimetric common RGB color space by a predetermined 3×3 matrix calculation.

In output color conversion 205, with respect to the image data in which the color space has been converted to the common color space, the common RGB color space is converted, through the interpolation calculation using a color conversion look up table (LUT) 210, to a printer color space suitable for a printer which consists of each of the color components such as cyan (C), magenta (M), yellow (Y), and black (K). The color conversion LUT 210 used according to the present exemplary embodiment is a three dimensional LUT in which each of color components, red (R), green (G), and blue (B) are divided at a certain grid point interval. An entry of each LUT includes a CMYK value in 8-bit accuracy corresponding to a grid point of the LUT. A known interpolation calculation is performed with respect to an input value using the three dimensional LUT, so that the image data is converted to image data consisting of the CMYK value.

Next, in filter processing 206, filter processing through product-sum operation is performed on the CMYK image data using a filter coefficient corresponding to a user setting. Accordingly, the output CMYK image data can be sharpened or smoothed.

With respect to the image data processed as described above, if necessary, density of each CMYK color is adjusted using a one-dimensional LUT in toner density adjustment 207. The toner density adjustment 207 is performed with a density characteristic corresponding to the user setting. Next, the density characteristic is corrected in gamma processing 208 by the one-dimensional LUT. In the gamma processing 208, both the input and output of the LUT have 9-bit accuracy. Finally, in halftone processing 209, the image data on which the gamma correction has been performed is converted into image data having halftone of each CMYK color in one bit using dither matrix 211, and the processing result is transmitted to the CPU 1106.

In the halftone processing 209, a value of the dither matrix 211 stored in the RAM 1107 is compared to the input image data, and one (1) is output if the value of the input image data is greater than the value of the dither matrix 211, whereas zero (0) is output if the value of the input image data is less than the value the value of the dither matrix 211. According to the present exemplary embodiment, in order to make the description simple, screen processing of one-bit output is described. However, the output bit number is not limited to one bit. Further, in the halftone processing 209, a plurality of dither matrices 211 can be switched and used based on an instruction from the CPU 1106. The image processing unit 1103 returns the processed printer output data 212 to the CPU 1106.

When the print function is operated, the image processing unit 1103 receives the image data rasterized by the PDL data processing from the CPU 1106 via the system bus 1109, and performs processing thereon. When the PDL function is operated, the MTF correction 203 and the input color conversion 204 are not necessary to be performed on the image read by a reader. Therefore, the processing performed in the MTF correction 203 and the input color conversion 204 is bypassed, and the processing of the output color conversion 205 and subsequent processing will be performed. The color matching processing using an international color consortium (ICC) profile may be performed at the printer driver before the image data is transmitted to the image processing unit 1103, or may be performed at the stage of the output color conversion 205. According to the present exemplary embodiment, the color matching processing performed at the printer driver will be exemplified.

The printer output data 212 that is output therefrom returns to the CPU 1106 from the image processing unit 1103, and is transmitted to the printer unit 114 eventually.

<Color Matching Method Selection>

FIG. 4 illustrates an example of a UI for selecting a color matching method at each object. The UI in FIG. 4 is displayed on the monitor 106 connected to the computer 10. The matching method such as "photographic (Perceptual)", "minimum color-difference (Colorimetric)", "vivid color (Saturation)", "Match Color with Monitor Color", or "Vivid Photo", and a source profile can be selected with respect to each object.

The "photographic" is selected when matching is performed by prioritizing the color to make an output result suitable for a photographic image. For example, "Perceptual" of the ICC profile corresponds to "photographic". Further, because the color gamut of "Vivid Photo" is wider than the color gamut of "photographic", "Vivid Photo" is selected when the image is printed in deeper and more vivid color than in "photographic". In a case where the matching method is changed from "photographic" to "Vivid Photo", a degree of the vividness to be increased may vary depending on colors. The term "vividness" used in the present exemplary embodiment means, for example, saturation of an image. For example, the vividness is improved in a blue color or a green color when the matching method is changed to "Vivid Photo" from "photographic", while the vividness is less improved in a red color.

In the example of UI in FIG. 4, "photographic" as a matching method 401 for an image, "Match Color with Monitor Color" as a matching method 402 for graphics, and "vivid color" as a matching method 403 for text are selected as the matching intent respectively. According to the present exemplary embodiment, an example in which the matching method 401 for the image is changed from "photographic" to "Vivid Photo" will be described.

<Color Matching Processing and Preview Image Display>

Figure 13:
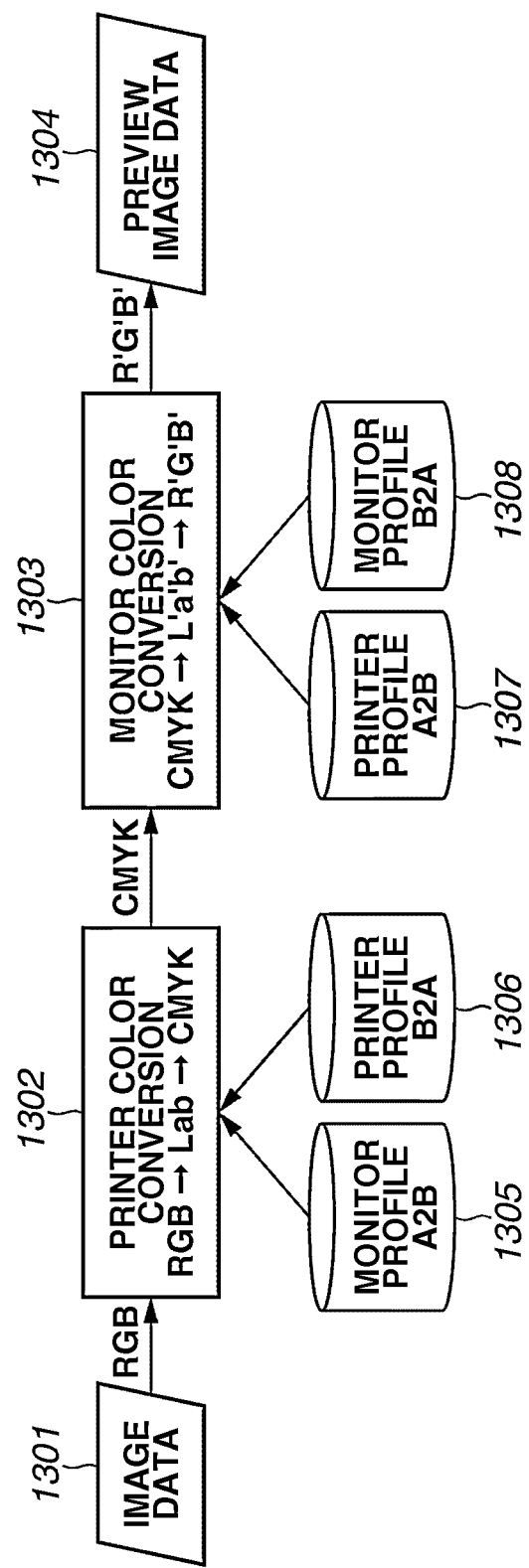
FIG. 13 is a block diagram illustrating color processing of a printer for color conversion and a preview image generation.

Details of preview image generation processing by the color matching using the ICC profile will be described with reference to FIG. 13. It is assumed that image data 1301 in FIG. 13 is RGB data in the color space of the monitor 106.

The image data 1301 as the RGB data is converted to the color space of the printer unit 114 by printer color conversion 1302. At first, with use of a monitor profile A2B table 1305 and a printer profile B2A table 1306 of the monitor 106, the RGB image data 1301 is mapped on a CMYK space of the printer unit 114 by gamut mapping via a device-independent L*a*b* color space. At this time, a plurality of types of color conversion tables such as "photographic (Perceptual)", "minimum color-difference (Colorimetric)", "vivid color (Saturation)", and "Vivid Photo" are stored in the printer profile B2A table 1306.

Next, in monitor color conversion 1303, with respect to the image data that has been converted to CMYK data, the color space is converted to the RGB color space of the monitor 106 for checking a preview image via the device-independent L*a*b* color space with use of a printer profile A2B table 1307 and a B2A table 1308 of the monitor profile. Accordingly, an output preview image 1304 in the printer unit 114 can be checked by the monitor 106.

The L*a*b* value of a thumbnail image of the image data described below can be calculated with use of the monitor profile A2B table 1305, the printer profile B2A table 1306, and the printer profile A2B table 1307 of the above processing. The A2B table is a look up table used in the conversion from a device-dependent color space to a device-independent color space, and the B2A table is a look up table used in the conversion from a device-independent color space to a device-dependent color space.

<Main Processing>

Hereinbelow, one aspect of the present invention will be described with reference to the flowchart in FIG. 14. According to the present exemplary embodiment, the processing in which a user uses the input/output devices such as the keyboard 105 and the mouse 107 that are connected to the computer 10 to change the color matching method on the printer driver will be described as an example. However, the processing will be similar to the changing operation using the operation unit 112 of the MFP 11. In a case where the computer 10 executes the processing in the flowchart in FIG. 14, a program for executing each processing in the flowchart in FIG. 14 stored in the ROM 103 or the external memory 108 is loaded on the RAM 102. Then, the CPU 101 executes the loaded program to execute the processing in the flowchart in FIG. 14. In a case where the MFP 11 executes the processing in the flowchart in FIG. 14, a program for executing each processing in the flowchart in FIG. 14 stored in the ROM 1108 or the external memory 113 is loaded on the RAM 1107. Then, the CPU 1106 executes the loaded program to execute the processing in the flowchart in FIG. 14.

First, the processing to be performed when a preview image after color matching can be displayed will be described.

In step S1401, the CPU 101 receives an instruction to output image data from a user. The image data includes application data of image editing software and office document editing software, and compressed image data.

In step S1402, the user instructs change of the color matching method via the UI for changing the color matching method illustrated in FIG. 4 serving as a printer driver setting screen at the time of printing. In step S1402, it is assumed that the matching method for an image is changed to "Vivid Photo" from "photographic". Further, in step S1402, the matching method may be changed to "vivid color" from "photographic", or to "Vivid Photo" from "vivid color". Then, the processing proceeds to step S1403.

Figure 3:
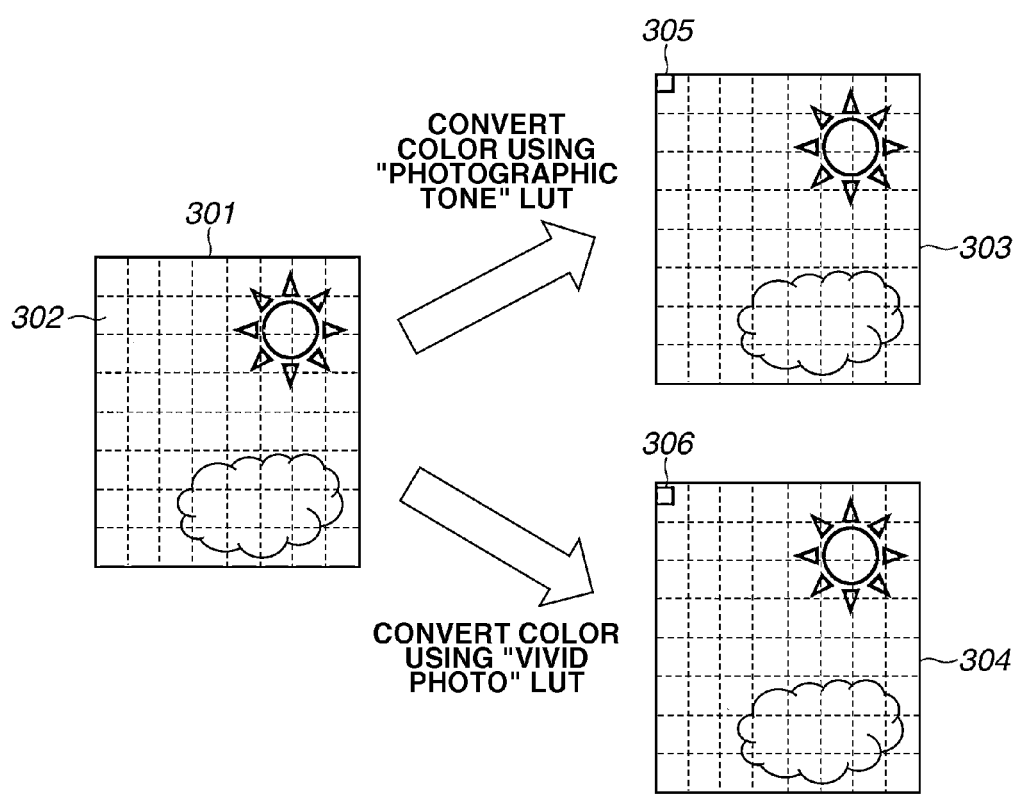
FIG. 3 illustrates color conversion processing using two color conversion look up tables (LUTs) while a thumbnail image is divided into a plurality of regions.

In step S1403, the computer 10 generates a thumbnail image with the resolution lower than that of the input image data, and divides the thumbnail image into a plurality of regions. For example, if an image 301 in FIG. 3 is assumed to be the thumbnail image, a region 302 corresponds to one of the divided regions. Accordingly, speed of subsequent processing such as color difference calculation can be increased, and a portion in which "an effect of changing the matching method to Vivid Photo is not seen" can be displayed as a preview image (described below). Then, the processing proceeds to step S1404.

In step S1404, the CPU 101 uses a color profile to calculate an L*a*b* value of each pixel in the thumbnail image before and after changing the color matching method. As described above in detail with reference to FIG. 13, the thumbnail image generated in step S1403 is converted to a Lab color space with use of the monitor profile A2B 1305, the printer profile B2A 1306, and the printer profile A2B 1307, and the Lab value of each pixel in the thumbnail image is calculated. In this processing, the Lab value of the thumbnail image is calculated using a profile of "photographic" (a first profile) as the printer profile B2A before the color matching method is changed, while using a profile of "Vivid Photo" (a second profile) as the printer profile B2A after the color matching method is changed.

In the example illustrated in FIG. 3, an image 303 represents an image on which color conversion is performed using the profile of "photographic", whereas an image 304 represents an image on which color conversion is performed using the profile of "Vivid Photo". The difference between L*a*b* values of pixels 305 and 306 having the same coordinates in respective images is calculated. Then, the processing proceeds to step S1405.

In step S1405, the CPU 101 calculates the difference between L*a*b* values of pixels having the same coordinates in the images before and after changing the color matching method, and compares the difference with a predetermined color difference threshold value. The color difference of before and after changing the color matching method calculated in step S1405 is a distance in the L*a*b* space. Further, the color difference threshold value is, for example, color difference threshold value ΔE=3. Then, the processing proceeds to step S1406.

In step S1406, the CPU 101 determines whether there is any region which includes a pixel with color difference less than the color difference threshold value. If such a region exists (YES in step S1406), the processing proceeds to step S1407. If such a region does not exist (NO in step S1406), the processing proceeds to step S1411.

In step S1407, the CPU 101 determines whether all of the regions include pixels with color difference less than the color difference threshold value. If all regions include the pixels with color difference less than the color difference threshold value (YES in step S1407), the processing proceeds to step S1413, and whereas if not (NO in step S1407), the processing proceeds to step S1408.

Figure 7A:
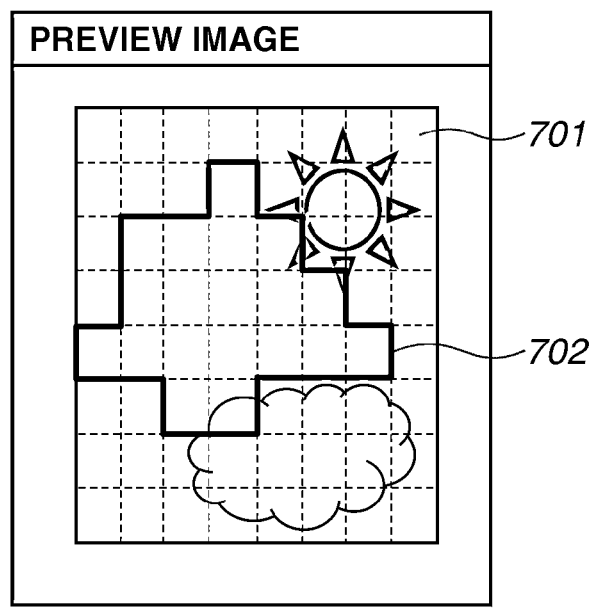
FIGS. 7A and 7B illustrate examples of preview images displayed according to the present invention.

In step S1408, the CPU 101 causes the monitor 106 to display a warning message as illustrated in FIG. 5 and a preview image as illustrated in FIG. 7A. A message such as "Changing from "photographic" to "Vivid Photo" has small effect on vividness of corresponding part of image. Would you like to change?" is displayed as the warning message, and a region 702 in which the color difference is less than the color difference threshold value is surrounded by a bold line and displayed in an emphasized manner in the preview image in FIG. 7. In order to describe a divided region, each of the regions is indicated by dotted lines as illustrated in a preview image 701. However, in practice, it is not necessary to show dotted lines.

The UI screen in FIG. 5 further displays three options 501 through 503. In a case where a cancel button 505 is pressed, this UI screen will be closed. Then, the processing proceeds to step S1409.

In step S1409, the CPU 101 determines whether the option 501 is selected. The option 501, "Yes. Please change to Vivid Photo.", is recommended when the user would like to make an image vivid as much as possible even though the region that can be more vivid is small. If the option 501 is selected and an OK button 504 is pressed (YES in step S1409), the processing proceeds to step S1410. If the option 501 is not selected (NO in step S1409), the processing proceeds to step S1414 for the option 502. In step S1410, the CPU 101 applies the matching method of Vivid Photo, and the processing proceeds to step S1411.

The option 502 in step S1414, "No. Please do not change to "Vivid Photo". (Please do not change anything.)", is the option for the user to perform color matching using the profile of "photographic" when the region that can be more vivid is small. If a color that the user wants to make it vivid would not be more vivid with use of the profile of "Vivid Photo", the user can use the profile of "photographic". If the user selects the option 502 and presses the OK button 504 (YES in step S1414), the processing proceeds to step S1415. If the user does not select the option 502 (NO in step S1414), the processing proceeds to step S1416 for the option 503. In step S1415, the CPU 101 applies the matching intent before making change, and the processing proceeds to step S1411.

The option 503 in step S1416, "No. Please do not change to "Vivid Photo" but perform other color adjustment.", is the option for leading the user to perform an adjustment for making the output image vivid by other methods. If the user selects the option 503 and presses the OK button 504, the UI shifts to the UI for selecting other color adjustment methods in FIG. 8. In a case where the option 503 is selected, the profile of "photographic" is used for the printer profile B2A. In the UI in FIG. 8, a contrast adjustment 801, a toner density adjustment 802, and an automatic adjustment 803 are displayed as the recommended adjustment methods. In a case where a cancel button 804 is pressed, subsequent processing will be cancelled.

Figure 9:
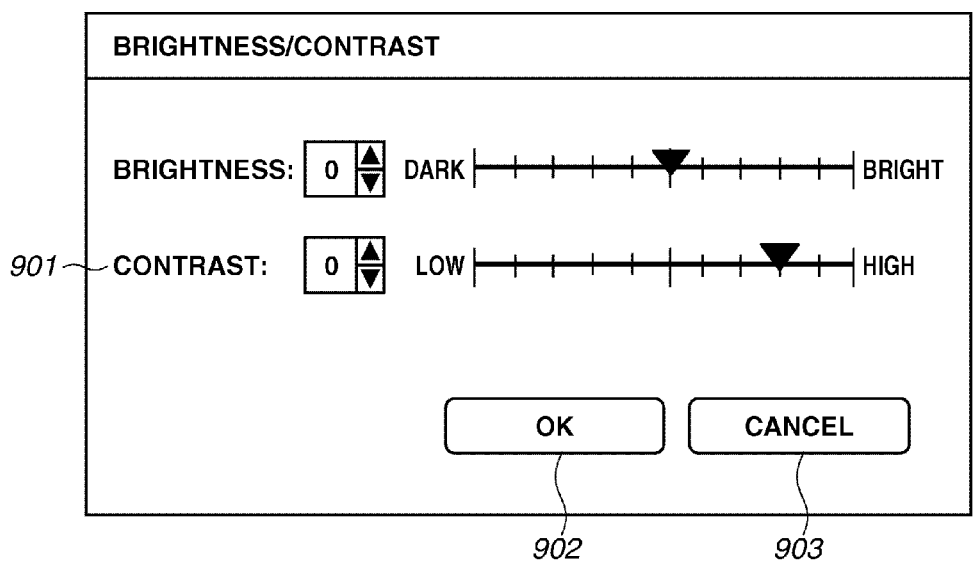
FIG. 9 illustrates an example of a UI for adjusting brightness and contrast.
Figure 10:
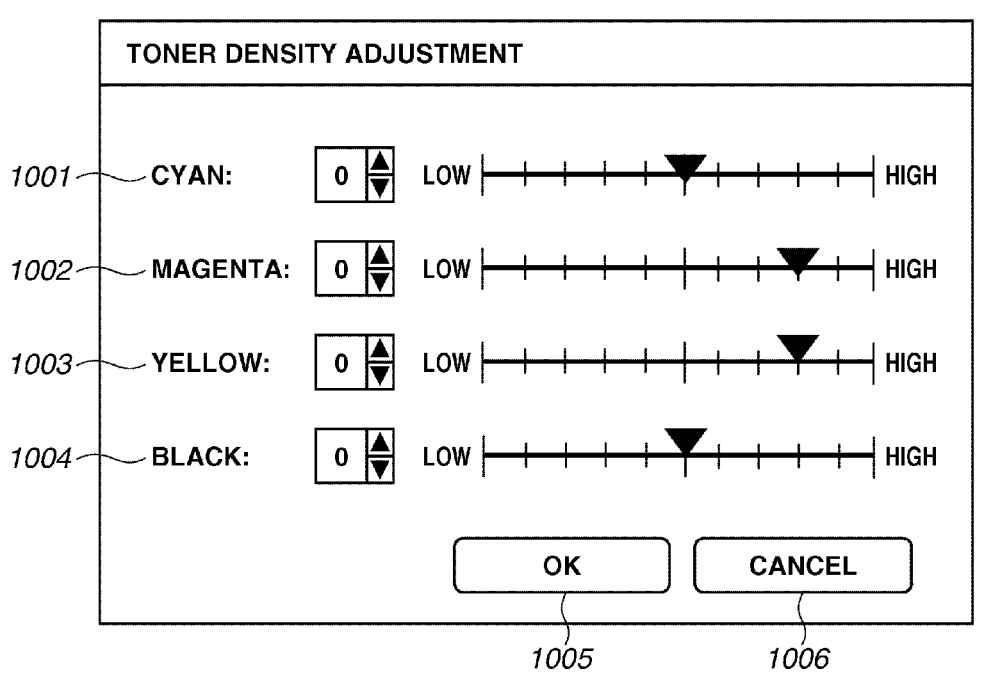

When the user presses the contrast adjustment button 801, a contrast adjustment screen illustrated in FIG. 9 is displayed on the monitor 106, so that the user can make an adjustment by operating a contrast adjustment bar 901. The user can confirm the adjustment by pressing an OK button 902, or cancel the adjustment by pressing a cancel button 903. In addition, the user can adjust the brightness by operating a brightness adjustment bar illustrated in FIG. 9. When the user presses the toner density adjustment button 802, a toner density adjustment screen illustrated in FIG. 10 is displayed on the monitor 106, and the user can make an adjustment by operating adjustment bars 1001, 1002, 1003, and 1004 of each toner color. The user can confirm the adjustment by pressing an OK button 1005, or cancel the adjustment by pressing a cancel button 1006. When the user presses the automatic adjustment button 803, an adjustment by which the vividness can be increased is executed automatically. For example, the adjustment which can maximize the contrast is executed automatically without causing the user to make an adjustment using the processing functions on the contrast adjustment screen in FIG. 9.

In step S1417, the CPU 101 applies contents of the adjustments, and the processing proceeds to step S1411.

Figure 6:
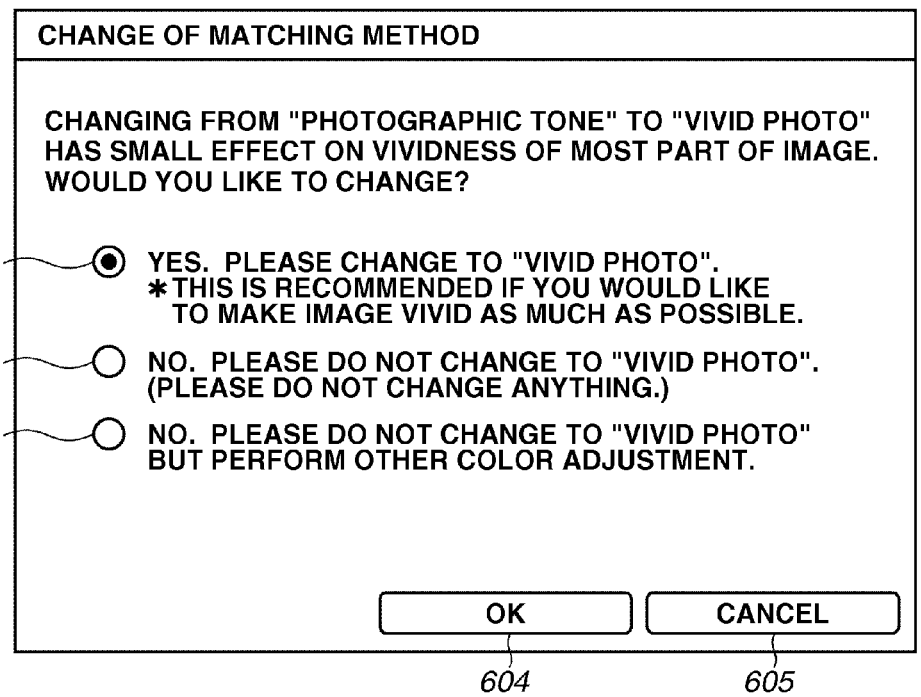
FIG. 6 illustrates an example of a warning message UI described in a second exemplary embodiment of the present invention.
Figure 7B:
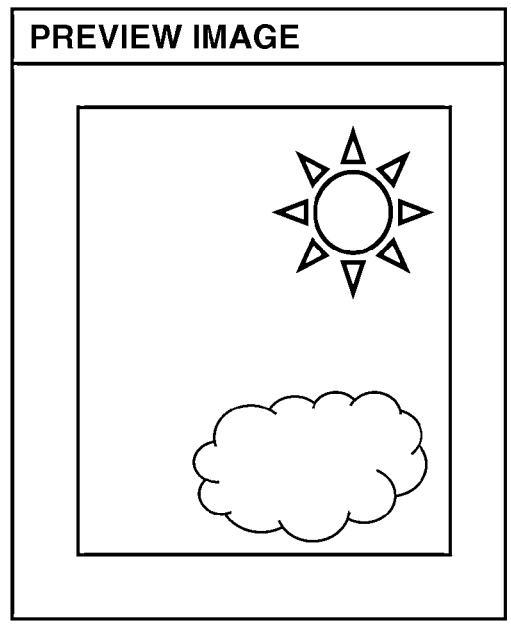

In a case where the processing proceeds to step S1413, a warning message UI illustrated in FIG. 16 and a preview image illustrated in FIG. 7B are displayed. A message such as "This is not recommended because changing from "photographic" to "Vivid Photo" has small effect." illustrated in FIG. 16 is displayed, and thus the user is notified that "Vivid Photo" is not recommended. FIG. 7B illustrates a preview image on which color conversion is performed with use of "Vivid Photo". Then, the processing proceeds to step S1414. In step S1414, the CPU 101 determines whether the user selects an option 1601, "No. Please do not change to Vivid Photo. (Please do not change anything.)". If the user selects the option 1601 (YES in step S1414), the processing proceeds to step S1415. In step S1415, the CPU 101 performs the above described processing. If the user selects an option 1602, "Please perform other color adjustment.", the processing proceeds to step S1416, and the CPU 101 performs the subsequent processing described above. In addition, in step S1413, the CPU 101 may display the warning message in FIG. 6 and provide the user with the option, "Yes. Please change to Vivid Photo."

In step S1411, the above print setting is confirmed by the user through the UI. In step S1412, the CPU 101 executes print processing. Then, the CPU 101 ends the processing.

As described above, according to the present exemplary embodiment, the user can check in advance whether the print output with desired vividness can be obtained and perform suitable operation accordingly. Further, because the user can confirm the preview image after changing the color matching method, time and effort for printing and a printing cost can be reduced.

According to the present exemplary embodiment, an example in which the CPU 101 executes a series of processing when the color matching method of one object is changed through the UI in FIG. 4 is described. However, the CPU 101 executes the above processing at each time when the color matching method of each object is changed through the UIs 401, 402, and 403. Alternatively, the CPU 101 may execute the above processing at a timing when the OK button 404 is pressed after the color matching methods are changed through the UIs 401, 402, and 403. Further, at a timing when the color matching method for each object is newly set, the CPU 101 may execute the above processing by comparing the color difference with the color matching method set for each object as a default.

Figure 8:
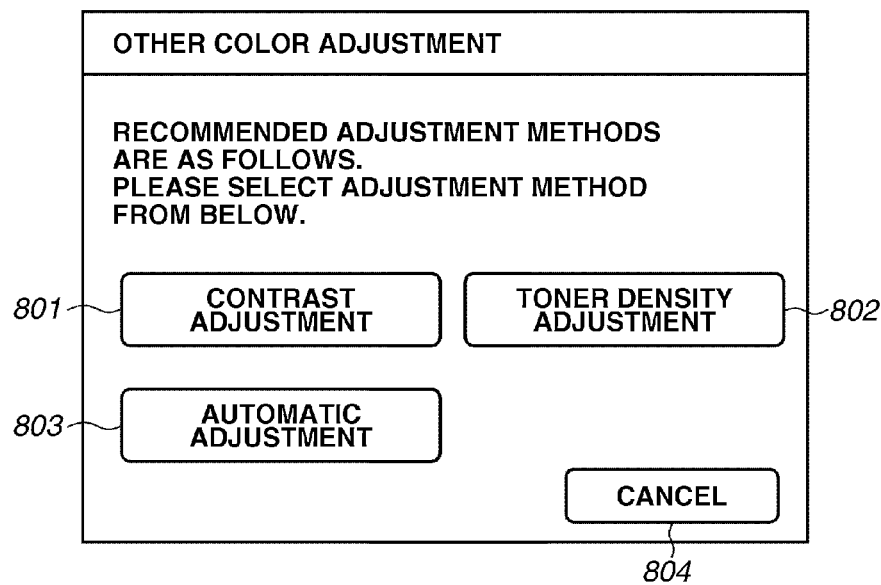
FIG. 8 illustrates an example of a UI for providing a user with other color adjustment methods.

Further, instead of calculating the color difference of the image before and after changing the color matching method, the CPU 101 analyzes the frequency distribution of colors in the image, and in a case where the color that is to be mapped in a vicinity of a boundary of the printer color reproduction range is widely distributed, the CPU 101 may display the UI in FIG. 8 to make the user select the adjustment method.

According to the present exemplary embodiment, the message is displayed when the color matching method that has been changed has a small effect on vividness of the image after making change. However, a message which indicates that an effect of image processing performed on the image is small may be displayed when the image processing is performed on the image without making any change on the color matching method. Further, after the color distribution of the image is analyzed, a message which indicates that the effect of image processing performed on the image is small may be displayed based on the analysis result. Furthermore, in the preview image in FIGS. 7A and 7B, a region with small effect of image processing may be surrounded by a bold line and displayed in an emphasized manner.

Figure 14:
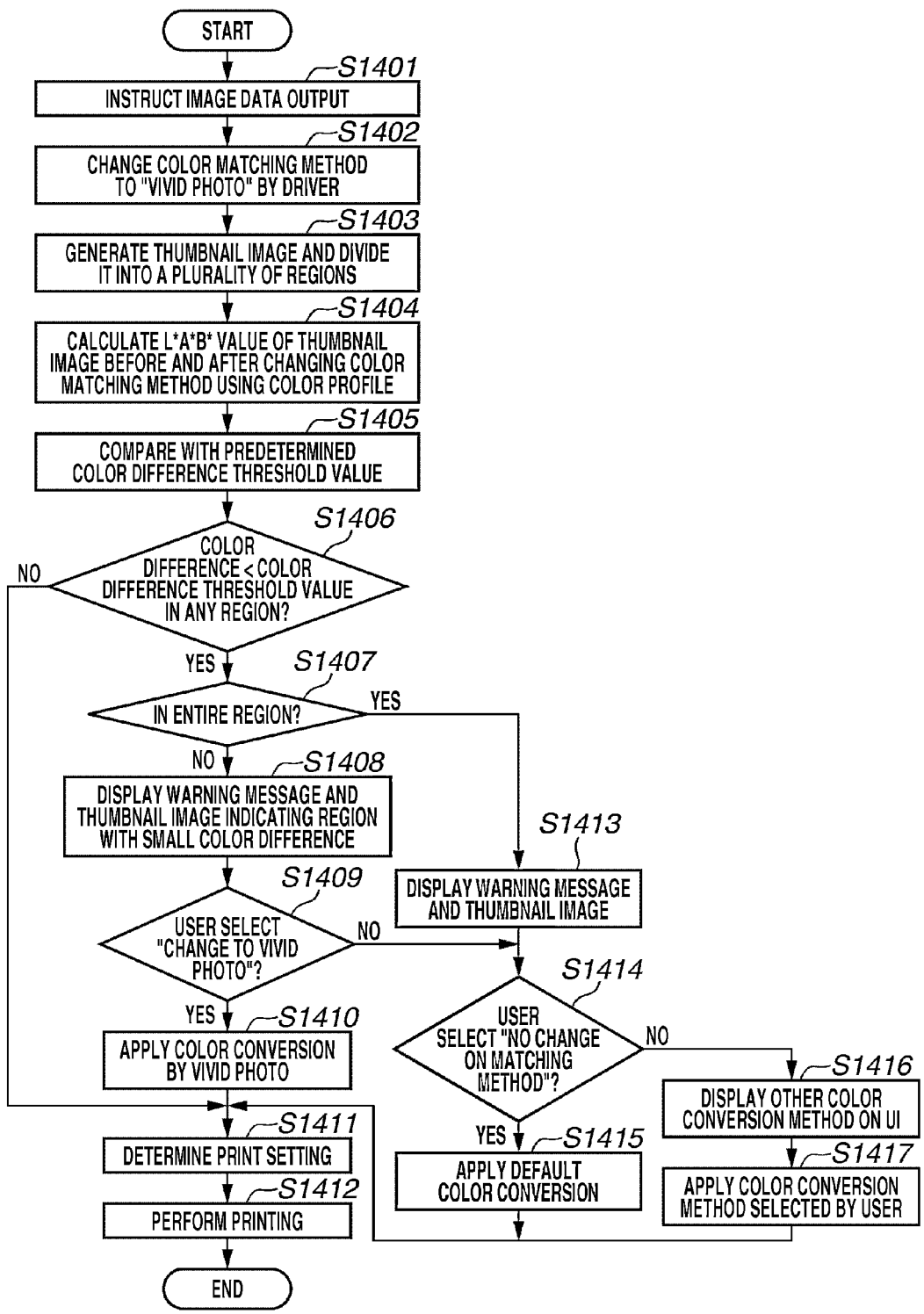
FIG. 14 is a flowchart illustrating a processing flow according to the first exemplary embodiment.

In addition, in the flowchart in FIG. 14, the processing is operated on the UI of the printer driver. However, the processing may be operated on the UI of the application installed in the computer 10.

According to the present exemplary embodiment, the UI is displayed on the monitor 106 connected to the computer 10. However, the UI may be displayed on the operation unit 112 of the MFP 11 to ask an instruction from the user.

In a second exemplary embodiment, a processing flow in which a preview image after changing a color matching method is not displayed will be described. According to the second exemplary embodiment, the number of pixels with color difference before and after changing the color matching method less than a color difference threshold value is determined. Then, based on the number of pixels with color difference less than the threshold value included in the entire image, the effectiveness thereof will be determined.

Figure 15:
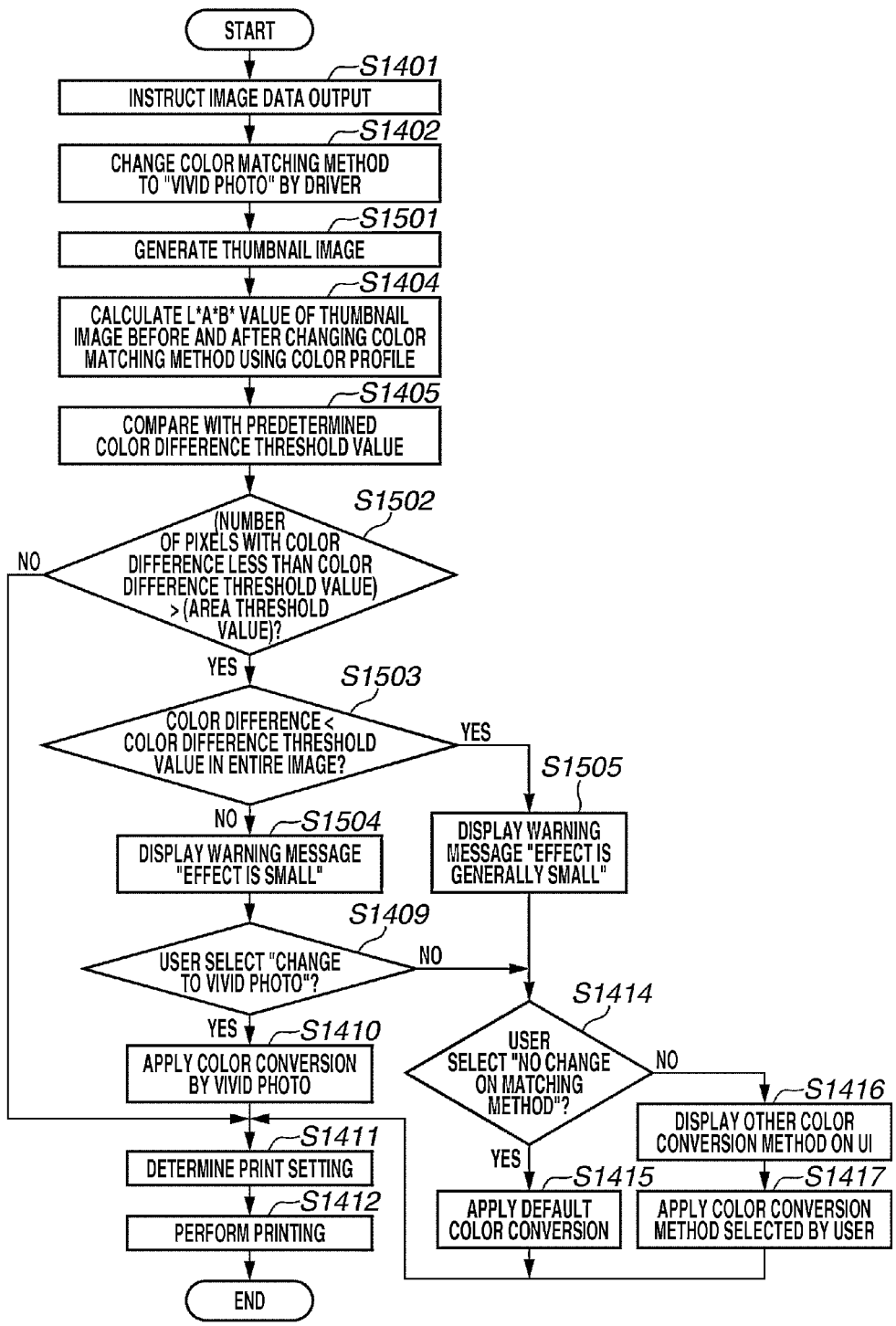
FIG. 15 is a flowchart illustrating a processing flow according to the second exemplary embodiment.

The processing flow according to the second exemplary embodiment will be described with reference to FIG. 15. In a case where the computer 10 executes the processing in the flowchart in FIG. 15, a program for executing each step of the processing in the flowchart in FIG. 15 stored in the ROM 103 or the external memory 108 is loaded on the RAM 102. Then, the CPU 101 executes the loaded program to execute the processing in the flowchart in FIG. 15. In a case where the MFP 11 executes the processing in the flowchart in FIG. 15, a program for executing each step of the processing in the flowchart in FIG. 15 stored in the ROM 1108 or the external memory 113 is loaded on the RAM 1107. Then, the CPU 1106 executes the loaded program to execute the processing in the flowchart in FIG. 15.

The processing in step S1401 through step S1402 is similar to that of the first exemplary embodiment, and thus the descriptions thereof will be omitted.

Next, in step S1501, the computer 10 generates a thumbnail image with the resolution lower than that of the input image data. Accordingly, processing speed of color difference calculation executed in step S1404 can be increased. Then, the processing proceeds to step S1404.

In step S1404, the CPU 101 uses the color profile to calculate the L*a*b* value of each pixel in the thumbnail image before and after changing the color matching method. This processing is described above in detail with reference to FIG. 13. Then, the processing proceeds to step S1405.

In step S1405, the CPU 101 calculates the color difference of each pixel before and after changing the color matching method, and compares the color difference with a predetermined color difference threshold value. For example, the color difference threshold value is set to be ΔE=3, and the CPU 101 counts the pixel with color difference less than the color difference threshold value. Then, the processing proceeds to step S1502.

In step S1502, the CPU 101 determines whether the number of pixels with the color difference less than the color difference threshold value is greater than a predetermined area threshold value. The area threshold value indicates how many pixels with small color difference between before and after changing the color matching method, i.e., pixels with small change, are included in the entire image, and thus the area threshold value may be set by the number of the pixels or a ratio of the pixels with small color difference to the entire pixels in the image. If the number of pixels with small color difference is greater than the area threshold value (YES in step S1502), the processing proceeds to step S1503. If the number of pixels with small color difference is equal to or less than the area threshold value (NO in step S1502), the processing proceeds to step S1411.

In step S1503, the CPU 101 determines whether the color difference before and after changing the color matching method is less than the color difference threshold value in all of the pixels. If the color difference before and after changing the color matching method is less than the color difference threshold value in all of the pixels (YES in step S1503), the processing proceeds to step S1505, whereas if not (NO in step S1503), the processing proceeds to step S1504.

In step S1504, the CPU 101 causes the monitor 106 to display the warning message illustrated in FIG. 6. This message indicates that changing to "Vivid Photo" has small effect on vividness of most part of the image. The UI screen in FIG. 6 includes three options 601 through 603. When the user presses a cancel button 605, this UI screen is closed. Then, the processing proceeds to step S1409.

The processing in steps S1409 through S1412 and the processing in steps S1414 through S1417 are similar to the processing in respective steps of the first exemplary embodiment illustrated in FIG. 14, and thus the descriptions thereof will be omitted.

In step S1505, as illustrated in FIG. 16, the CPU 101 displays the warning message which indicates that the effect of "Vivid Photo" is small in the entire image. This processing is mostly the same as the processing of the first exemplary embodiment except for the point that the preview image is not displayed. In step S1414, the CPU 101 determines whether the user selects the option 1601, "No. Please do not change to Vivid Photo. (Please do not change anything.)". If the user selects the option 1601 (YES in step S1414), the processing proceeds to step S1415. In step S1415, the CPU 101 performs the above described processing. If the user selects the option 1602, "Please perform other color adjustment." (NO in step S1414), the processing proceeds to step S1416. Subsequently, in steps S1411 and S1412, the CPU 101 performs the above described processing.

As described above, in a case where the CPU 101 does not display the preview image after changing the color matching method, depending on how many regions with small color difference before and after making change are included in the image, the CPU 101 makes a determination on providing the user with the warning message.

Figure 11:
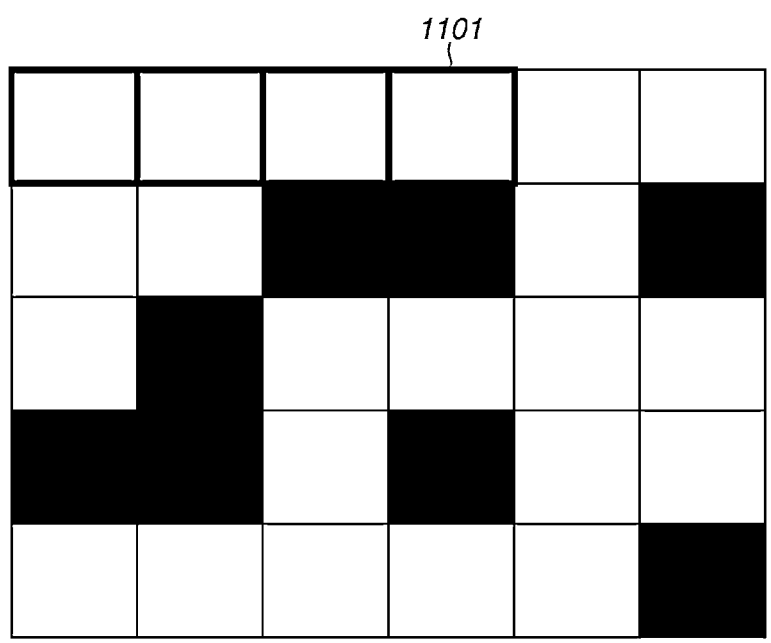
FIG. 11 illustrates an example of a color palette described in a third exemplary embodiment of the present invention.

In a third exemplary embodiment, a method for indicating a color on which no effect is seen will be described with reference to a flowchart in FIG. 18. In this method, a color palette in which sample colors are arranged as illustrated in FIG. 11 is provided, and colors 1101 on which no effect is seen are indicated by surrounding with a bold line. According to the present exemplary embodiment, the sample colors may be RGB signal values in 256 colors, or colors of uniform grid points in which 8-bit signal values 0 through 255 of red, green, and blue are divided at regular intervals. In any case, it is desirable to provide the sample colors which uniformly include the color space that can be displayed thereby.

Figure 18:
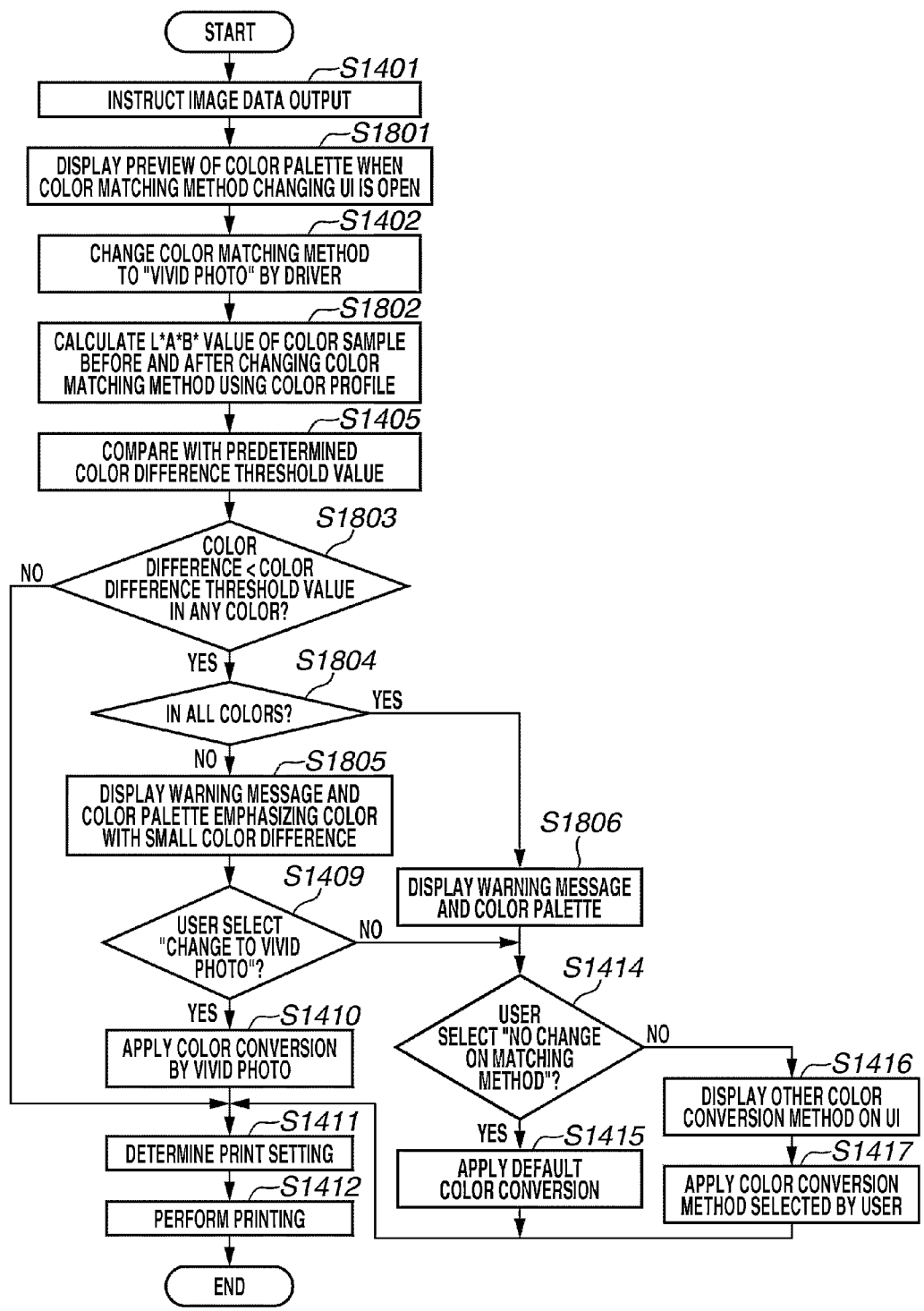
FIG. 18 is a flowchart illustrating a processing flow according to the third exemplary embodiment.

In a case where the computer 10 executes the processing in the flowchart in FIG. 18, a program for executing each processing in the flowchart in FIG. 18 stored in the ROM 103 or the external memory 108 is loaded on the RAM 102. Then, the CPU 101 executes the loaded program to execute the processing in the flowchart in FIG. 18. In a case where the MFP 11 executes the processing in the flowchart in FIG. 18, a program for executing each processing in the flowchart in FIG. 18 stored in the ROM 1108 or the external memory 113 is loaded on the RAM 1107. Then, the CPU 1106 executes the loaded program to execute the processing in the flowchart in FIG. 18.

In step S1401, the CPU 101 receives an instruction to output image data from the user. Then, the processing proceeds to step S1801.

In step S1801, when the user opens the UI for changing the color matching method illustrated in FIG. 4, the CPU 101 generates a thumbnail image of input image data, and causes the monitor 106 to display a color palette on which the color conversion is performed using the color matching method of that time.

In step S1402, the user changes the color matching method to Vivid Photo. Then, in step S1802 and the subsequent steps, the CPU 101 determines whether the effect thereof can be seen on each of the colors on the color palette.

In step S1802, the CPU 101 calculates, using the color profile, the L*a*b* value of the color sample before and after changing the color matching method. This processing is described above in detail with reference to FIG. 13. The processing in step S1405 is similar to that of the first exemplary embodiment. Therefore, the descriptions thereof will be omitted.

In step S1803, the CPU 101 determines whether there is any sample color with the color difference before and after changing the color matching method less than the color difference threshold value. If such a sample color exists (YES in step S1803), the processing proceeds to step S1804. If such a sample color does not exist (NO in step S1803), the processing proceeds to step S1411.

In step S1804, the CPU 101 determines whether color differences of all the sample colors are less than the color difference threshold value. If all the color differences of the sample colors are less than the color difference threshold value (YES in step S1804), the processing proceeds to step S1806, and whereas if not (NO in step S1804), the processing proceeds to step S1805.

In step S1805, the CPU 101 displays a warning message such as "The effect is small on the sample colors indicated in the color palette.", and further displays the color palette after color conversion. On the color palette, the sample colors 1101 on which the effect is small are displayed in an emphasized manner as illustrated in FIG. 11.

In step S1806, the CPU 101 displays a message "The effect is small on all of the sample colors." as a warning message, and causes the monitor 106 to display the color palette on which the color conversion is performed using the Vivid Photo.

The processing in steps S1409 through S1412 and the processing in steps S1414 through S1417 are similar to the processing in respective steps of the first exemplary embodiment illustrated in FIG. 14, and thus the descriptions thereof will be omitted.

In this manner, the color with small color difference can be displayed with use of the color palette.

Figure 19:
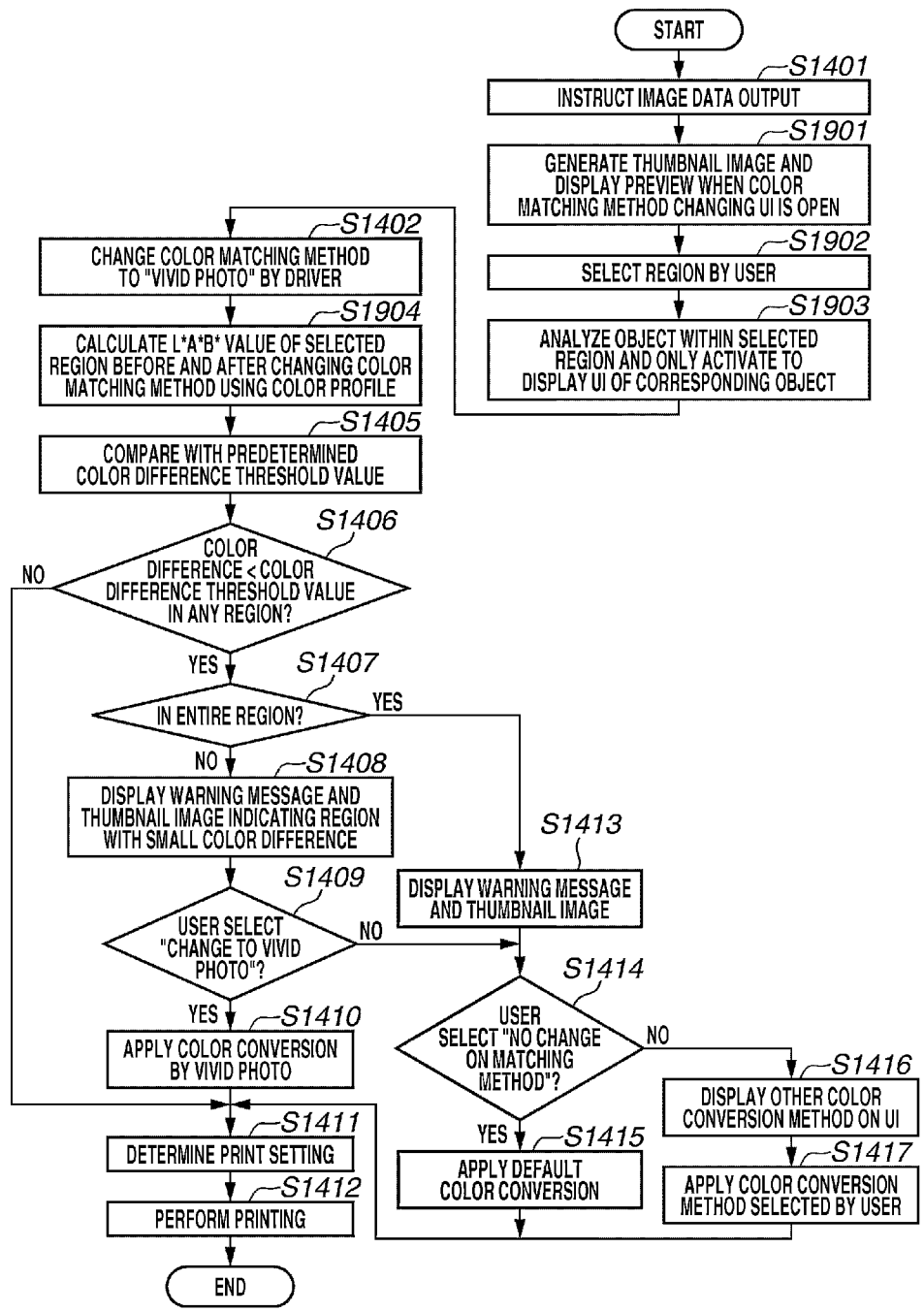
FIG. 19 is a flowchart illustrating a processing flow according to the fourth exemplary embodiment.

In a fourth exemplary embodiment, a method in which a region where a color is to be changed is selected from a preview image by a user will be described with reference to a flowchart in FIG. 19. In a case where the computer 10 executes the processing in the flowchart in FIG. 19, a program for executing each processing in the flowchart in FIG. 19 stored in the ROM 103 or the external memory 108 is loaded on the RAM 102. Then, the CPU 101 executes the loaded program to execute the processing in the flowchart in FIG. 19. In a case where the MFP 11 executes the processing in the flowchart in FIG. 19, a program for executing each processing of the flowchart in FIG. 19 stored in the ROM 1108 or the external memory 113 is loaded on the RAM 1107. Then, the CPU 1106 executes the loaded program to execute the processing in the flowchart in FIG. 19.

In step S1401, the CPU 101 receives an instruction to output image data from the user. Then, the processing proceeds to step S1901.

Figure 12:
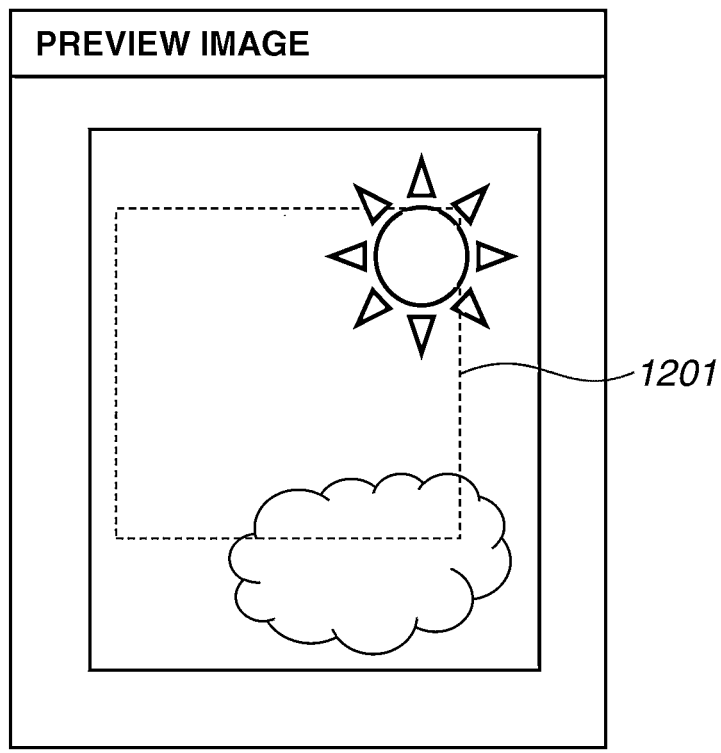
FIG. 12 illustrates an example of a preview image described in a fourth exemplary embodiment of the present invention.

In step S1901, when the user opens the UI for changing the color matching method illustrated in FIG. 4, the CPU 101 generates a thumbnail image of input image data, and causes the monitor 106 to display a preview image illustrated in FIG. 12 on which the color conversion is performed using the color matching method of that time.

In step S1902, as illustrated in FIG. 12 as a region 1201 of the preview image, the CPU 101 causes the user to select a region where the user would like to have the effect of changing the color matching method by the input device such as the mouse 107.

In step S1903, the CPU 101 analyzes the attribute of the object existing in the selected region. Based on the analysis result, the CPU 101 displays the UI for changing the color matching method for the attribute of the object existing in the selected region in an emphasized manner, and clearly notifies the user that which attribute should be changed. For example, in a case where an image and graphics exist in the selected region, there is provided a method in which the UIs 1701 and 1702 for changing the color matching methods of image and graphics are displayed in an activated manner, while the UI 1703 for changing the color matching method of text is grayed out as illustrated in FIG. 17. Then, when the user changes the color matching method thereof, the CPU 101 performs the processing in step S1904 and the subsequent steps with respect to each object in the selected region. The processing in step S1405 and the subsequent steps are similar to those of the first exemplary embodiment, and thus the descriptions thereof will be omitted.

According to the above-described manner, the effect of changing the color matching method can be informed the user by specializing in a region where the user would like to change the color.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-122903 filed May 30, 2012, which is hereby incorporated by reference herein in its entirety.

What is claimed is:

1. An image processing apparatus comprising:
    an input unit configured to input an instruction to perform color conversion;
    a color conversion unit to perform color conversion based on the instruction by using a first color matching profile; and
    a display unit configured to display a message which indicates that an effect of color conversion on the vividness of an image is small, in a case where a color difference between the image on which color conversion has been performed by using the first color matching profile and the image on which color conversion has been performed by using a second color matching profile is less than a color matching threshold value,
    wherein the display unit further displays a message for making a selection whether color conversion is performed by using the first color matching profile or color conversion is performed by using the second color matching profile from among a plurality of color matching profiles.

2. A non-transitory program for causing a computer to function as an image processing apparatus according to claim 1.

3. The image processing apparatus according to claim 1, wherein the display unit further displays a region in the image where the color difference is less than a color matching threshold value in an emphasized manner.

4. The image processing apparatus according to claim 1, further comprising an output unit configured to output the image which is obtained by applying a color conversion method that is selected from the message for making a selection to the image.

5. The image processing apparatus according to claim 1, wherein the display unit further displays a message for making a selection of color adjustment, contrast adjustment, brightness adjustment, or density adjustment.

6. The image processing apparatus according to claim 1, wherein the display unit further displays a message for causing a user to make a selection of performing color conversion using the first color matching profile, performing color conversion using the second color matching profile, or performing color adjustment, contrast adjustment, brightness adjustment and/or density adjustment.

7. The image processing apparatus according to claim 1, wherein the display unit displays the message in a case where color difference between the image on which color conversion has been performed by using the first color matching profile and the image on which color conversion has been performed by using the second color matching profile is calculated for each pixel and a ratio of pixels with small color difference is greater than a predetermined color matching threshold value.

8. The image processing apparatus according to claim 1, wherein the display unit further displays a color of which color difference is less than a color matching threshold value in the image with use of a color palette.

9. The image processing apparatus according to claim 1, wherein the first color matching profile or the second color matching profile are a B2A table of a printer profile.

10. The image processing apparatus according to claim 1, wherein the display unit displays a preview image on which color conversion is performed by using the color matching first profile;
    wherein the display unit further includes a selection unit configured to select a region from the displayed preview image;
    wherein the display unit displays a change in the color matching profile only for an attribute of an object existing in the region selected by the selection unit.

11. An image processing apparatus comprising:
    an analysis unit configured to analyze color distribution in an image; and
    a display unit configured to display a message which indicates that an effect of image processing performed on the image is small, based on a result of analysis performed by the analysis unit,
    wherein the display unit further displays a region of the image where effect of the image processing is small in an emphasized manner.

12. The image processing apparatus according to claim 11, wherein the display unit further displays a message for making a selection of color adjustment, contrast adjustment, brightness adjustment, or density adjustment.

13. A method for processing an image, the method comprising:
    analyzing color distribution in an image; and
    displaying a message which indicates that an effect of image processing performed on the image is small based on the analyzing,
    wherein further displaying a region of the image where effect of the image processing is small in an emphasized manner.

14. A method for processing an image, the method comprising:
    inputting an instruction to perform color conversion by using a first color matching profile; and displaying a message which indicates that an effect of color conversion on vividness of an image is small, in a case where a color difference between the image on which color conversion has been performed by using the first color matching profile and the image on which color conversion has been performed by using a second color matching profile is less than a color matching threshold value, wherein further displaying a message for making a selection whether color conversion is performed by using the first color matching profile or color conversion is performed by using the second color matching profile from among a plurality of color matching profiles.

\* \* \* \* \*